(12) United States Patent
Appleford et al.

(10) Patent No.: US 6,640,901 B1
(45) Date of Patent: Nov. 4, 2003

(54) RETRIEVABLE MODULE AND OPERATING METHOD SUITABLE FOR A SEABED PROCESSING SYSTEM

(75) Inventors: David Eric Appleford, Epping (GB); Brian William Lane, Canvey Island (GB)

(73) Assignee: Alpha Thames Ltd., Essex (GB)

( * ) Notice: Subject to any disclaimer, the term of this patent is extended or adjusted under 35 U.S.C. 154(b) by 0 days.

(21) Appl. No.: 10/070,722

(22) PCT Filed: Aug. 18, 2000

(86) PCT No.: PCT/GB00/03227

§ 371 (c)(1),
(2), (4) Date: Mar. 5, 2002

(87) PCT Pub. No.: WO01/20128

PCT Pub. Date: Mar. 22, 2001

(30) Foreign Application Priority Data

Sep. 10, 1999 (GB) .............................................. 9921373

(51) Int. Cl.[7] .............................................. E21B 29/12
(52) U.S. Cl. .................... 166/357; 166/366; 166/75.12; 166/267
(58) Field of Search .............................. 166/357, 75.12, 166/265, 267, 339–342, 348, 349, 366

(56) References Cited

U.S. PATENT DOCUMENTS

| | | | | |
|---|---|---|---|---|
| 2,767,802 A | * | 10/1956 | Orrell ........................... | 96/174 |
| 3,366,173 A | * | 1/1968 | McIntosh ..................... | 166/356 |
| 3,503,443 A | * | 3/1970 | Blanding et al. ............ | 166/344 |
| 3,536,135 A | * | 10/1970 | Dozier ......................... | 166/347 |
| 3,556,218 A | * | 1/1971 | Talley et al. ................ | 166/265 |
| 3,590,919 A | | 7/1971 | Talley, Jr. | |
| 3,602,302 A | * | 8/1971 | Kluth .......................... | 166/336 |
| 3,621,911 A | * | 11/1971 | Baker et al. ................ | 166/336 |
| 3,643,736 A | * | 2/1972 | Talley, Jr. .................... | 166/356 |
| RE27,308 E | * | 3/1972 | Leonard ...................... | 166/357 |
| 3,754,380 A | * | 8/1973 | McMinn et al. .............. | 96/113 |
| 4,438,817 A | * | 3/1984 | Pokladnik et al. .......... | 166/341 |
| 4,527,632 A | * | 7/1985 | Chaudot ...................... | 166/357 |
| 4,547,149 A | * | 10/1985 | Chaudot ...................... | 431/202 |
| 4,848,475 A | * | 7/1989 | Dean et al. .................. | 166/357 |
| 4,982,794 A | * | 1/1991 | Houot .......................... | 166/357 |
| 5,044,440 A | * | 9/1991 | Stinessen et al. ........... | 166/344 |
| 5,114,117 A | | 5/1992 | Appleford et al. | |
| 5,494,110 A | | 2/1996 | Appleford | |
| 6,197,095 B1 | * | 3/2001 | Ditria et al. .................. | 95/248 |
| 6,234,248 B1 | * | 5/2001 | Knight ....................... | 166/105.5 |
| 6,456,902 B1 | * | 9/2002 | Streetman ................... | 700/282 |

FOREIGN PATENT DOCUMENTS

| | | |
|---|---|---|
| GB | 2 202 561 A | 9/1988 |
| GB | 2 242 373 A | 10/1991 |
| GB | 2 255 102 A | 10/1992 |
| WO | WO 00/47864 | 8/2000 |

* cited by examiner

Primary Examiner—Robert E. Pezzuto
Assistant Examiner—Thomas A. Beach
(74) Attorney, Agent, or Firm—Summa & Allan, P.A.

(57) ABSTRACT

A retrievable fluid separation module (2) for a seabed processing system to which flow lines are connected includes one portion (60) of a multi-ported valve isolation connector (5) and a separator chamber (6) for separating a plurality of fluids from a received fluid mixture. The separator chamber has an inlet flow line (12) for the received fluid mixture and an outlet flow line (15, 16) for each separated fluid. The flow lines are connected to the one portion of the connector (5) which selectively isolates the module from or connects it to the flow lines by means of a second complementary portion (61) of the multi-ported valve isolation connector with which the first portion is adapted to engage. There may be a modulating valve (25) in at least one outlet flow line (16) for controlling flow therethrough and a control actuator (63) for controlling the or each modulating valve.

27 Claims, 15 Drawing Sheets

RETRIEVABLE MODULE AND OPERATING METHOD SUITABLE FOR A SEABED PROCESSING SYSTEM

BACKGROUND OF THE INVENTION

The present invention relates to a retrievable module suitable for a seabed processing system and its use for exploiting oil/gas fields and, more particularly, those underwater.

Conventional oil/gas fields have a plurality of wells linked to a host facility which receives the oil/gas via flow lines. A conventional underwater oil/gas field may include controllable underwater equipment between the wells and the host facility. It would be useful to reconfigure or replace part of the underwater equipment without having to shut down or significantly reduce production from the field.

Such underwater equipment which requires controlling conventionally relies on at least one expensive and complex multiple conduit that provides a hydraulic line to connect each equipment component to a facility on/above the sea surface or onshore.

In the case of wells which are used to extract oil/gas from sub-seabed reservoirs, pressure in the reservoir enables the oil/gas to flow up to the seabed and then on to the host facility. Later in the field life, reservoir pressure can reduce to the point where it is insufficient to allow the oil/gas to flow to the host facility. Current wellhead equipment designed to cope with the initial reservoir pressure cannot be upgraded to suit the subsequent reduction in reservoir pressure. Until now, only individual items of equipment have been identified as having the potential to be removed or replaced and the replacement parts must be designed to fit as before. Underwater processing units cannot be adjusted to suit the changing characteristics of the field.

A further problem is that when well pressure drops below the oil's so-called bubble point, gas breaks out forming gas slugs, particularly in pipeline undulations. To prevent such slugs forming and subsequently damaging downstream equipment, expensive, high power consumption variable speed motor driven multiphase pumps are required. Such pumps are difficult to control over large "step-out" distances.

A well may be tested by diverting fluid from a well into a dedicated test flow line back to the host facility where it is routed to a test separator and its separated fluids measured. However, it is expensive to provide an additional test flow line.

SUMMARY OF THE INVENTION

It is an object of the present invention to provide an improved system which alleviates/solves at least some of the problems mentioned above.

According to the present invention there is provided a retrievable module for a system to which external flow lines are connected, the module including a first portion of a module isolating and connecting means and means for acting on received fluid, comprising at least one inlet flow line for the received fluid and at least one outlet flow line, the at least one inlet flow line and the outlet flow line being connected to the first portion of the module isolating and connecting means for selectively isolating the module from or connecting it to the external flow lines by means of a second complementary portion of the module isolating and connecting means with which the first portion of the module isolating and connecting means is adapted to engage.

There may be provided a plurality of inlet flow lines and one outlet flow line and the means for acting on received fluid interconnects the inlet flow lines and the outlet flow line. The means for acting on the fluid may include a pump.

According to a further aspect of the present invention there is provided a method for acting on fluids in a system to which external flow lines are connected, characterised by the steps of:

providing first and second retrievable modules each module including a first portion of a module isolating and connecting means and first and second means respectively for acting on received fluid in first and second ways respectively, each means for acting on the received fluid comprising at least one inlet flow line for the received fluid and at least one outlet flow line, the at least one inlet flow line and the outlet flow line being connected to the first portion of the module isolating and connecting means for selectively isolating each module from or connecting it to the external flow lines by means of a common second complementary portion of the module isolating and connecting means with which each first portion of the module isolating and connecting means is adapted to selectively engage;

connecting the first module to the processing system;

acting on the fluid received in the first way;

disconnecting the module from the processing system;

replacing the first module with the second module for acting on received fluid in a second way;

connecting the second module to the processing system; and acting on the received fluid in the second way.

Use of the module isolating and connecting means enables easy diverless module replacement within a short time scale for modification or repair or to change the way a field is exploited to take account of changes in its characteristics such as changes in the mix of fluids it produces and/or a change in the pressure under which the fluids are expelled from the field.

According to a particular aspect of the present invention there is provided a retrievable fluid separation module for a processing system to which external flow lines are connected, the module including a first portion of a module isolating and connecting means and a separator vessel or chamber for separating a plurality of fluids from a received fluid mixture, the separator vessel having at least one inlet flow line for the received fluid mixture and at least one outlet flow line for each separated fluid, the at least one inlet flow line and the outlet flow lines being connected to the first portion of the module isolating and connecting means for selectively isolating the module from or connecting it to the external flow lines by means of a second complementary portion of the module isolating and connecting means with which the first portion of the module isolating and connecting means is adapted to engage.

By having a processing system with a retrievable fluid separation module, the separation of fluids at or near the head of a well on, say, a seabed, avoids multiphase flow problems in flow lines to the host facility, especially where there is a long distance between the well and the host facility. Furthermore, the problem associated with the formation of hydrates in fluid being conveyed to the host facility can be largely avoided, thus largely obviating the requirement for the injection of inhibitors close to the wellhead. Such separation can also lead to an increase of approximately 75% in the total production from a given field.

It may be desirable for the module to include a modulating valve in at least one outlet flow line for controlling flow therethrough and a control actuator for controlling the or each modulating valve. Control means may be provided for controlling operation of the module. The module may have sensing means with an output or outputs connected to the control means. The output from the control means may be connected to at least one of the control actuators for controlling its associated outlet flow line modulating valve. The control means ensures that the level within the separator vessel remain within operating limits by monitoring the level via the sensing means and implementing the operation of the modulating valve accordingly. If abnormal trends or occurrences are detected, then alarm signals are sent to the host facility where manual operation of the processing system can be undertaken.

The control means may be at least substantially an electrical control means or the control means comprises a completely electrical control means. Electrical control means enables the processing system to operate over greater distances/deeper levels, transmit emergency signals instantaneously, such as to shut down a part of the system, and is cheaper to manufacture and maintain.

The sensing means may comprise a fluid interface sensing means for detecting the position of an interface between two of the separated fluids in the separator vessel. Alternatively, the sensing means may comprise means for sensing a plurality of fluid interfaces between three or more separated fluids in the separator vessel.

Conveniently, the module includes pressure measuring means for measuring pressure in the separator.

Chemical injection means may be provided which are connected to the at least one outlet flow line.

The module may have a power connector for connection to a power source remote from the module to provide power for the module. The power connector may have an associated transformer. The power connector may be adapted to carry control signals to or from the module. Alternatively, separate control signal connection means may be connected to the control means, the control signal connection means being adapted to transmit or receive control signals from beyond the module. Use of the power connector and, where necessary, the control signal connection means, enables easy diverless recovery and re-installation of the module within a short time scale for modification or repair.

The retrievable module, by having components for separating fluids, and for control and power all within the module, enables it to be fully pre-tested before being installed in the processing system.

At least one of the separated fluids may be substantially a liquid and the outlet flow line for the liquid includes pumping means. Desirably, the pumping means in the one or more of the outlet flow lines comprises a single speed pump. By having a pump operated by a single speed motor for transport of fluid and using a modulating valve and actuator in conjunction with the sensing means, the need for speed control of large, complex, variable speed multiphase pumps is overcome.

The liquid outlet flow line may have a return branch to the separator downstream of the pumping means. The return branch may have a flow restrictor therein.

The first portion of the module isolating and connecting means may comprise a multiported fluid connector. The multiported fluid connector may have pairs of valves, one valve of each pair being in the opposite portion of the multiported fluid connector to the other valve of the pair.

Conveniently, at least some of the valves are interconnected in a gang so as to be actuatable simultaneously.

A choke valve may be provided in the at least one inlet flow line. The choke valve may have a control actuator.

Differential pressure measuring means may be included for measuring differential pressure across the choke valve. The differential pressure measuring means may be connected to the control means which includes means for controlling the choke valve in a manner dependent upon output from the pressure sensing means.

Desirably, the module includes at least one fail-safe valve for controlling flow into the separator vessel. It may be convenient for the fail-safe valve to close in the absence of an electrical signal thereto. At least two such fail-safe valves may be provided in series.

A flowmeter may be provided in the at least one outlet flow line, the flowmeter having an associated flowrate transducer connected to the control means.

At least one separated fluid may be substantially a gas and at least one outlet flow line for the gas may include a gas compressor.

According to another aspect of the present invention there is provided a method for separating fluids in a processing system to which external flow lines are connected, characterised by the steps of:

connecting a retrievable fluid separation module to the processing system;

receiving a fluid mixture in the module from the at least one flow line;

separating in the module a plurality of fluids from the received fluid mixture; and removing at least some of the separated fluids from the module.

The method may additionally include the step of removing the retrievable fluid separation module from the processing system.

According to a further aspect of the invention there is provided a method for separating fluids in a processing system to which external flow lines are connected, characterised by the steps of:

providing a retrievable fluid separation module including a first portion of a module isolating and connecting means for selectively isolating the module from or connecting it to the external flow lines by means of a second complementary portion of the module isolating and connecting means with which the first portion of the module isolating and connecting means is adapted to engage;

receiving in a separator vessel a received fluid mixture via at least one inlet flow line connected to the first portion of the module isolating and connecting means;

separating in the separator vessel a plurality of fluids from the received fluid mixture; and removing from the vessel the separated fluids via at least one outlet flow line for each fluid, the outlet flow lines being connected to the first portion of the module isolating and connecting means.

The method may additionally include the step of controlling flow in the at least one outlet flow line by providing a modulating valve therein and a control actuator for controlling the or each modulating valve. Desirably, the method includes the step of detecting the position of a fluid interface between two of the separated fluids in the separator vessel by providing sensing means with an output or outputs connected to control means for controlling operation of the module.

According to yet another aspect of the invention there is provided a modular processing system comprising at least two retrievable at least substantially autonomous modules, and a plurality of module-isolating and connecting means, each retrievable autonomous module being connected to at least one flow line by one module isolating and connecting means, the modules being connected to the at least one flow line and each module is adapted to be isolated from the at least one flow line by its respective module isolating and connecting means without affecting the operation of or the connection of the remaining modules with the at least one flow line. There may be a plurality of flowlines to which the modules are connected in parallel.

There may be a plurality of processing systems connected by the at least one flow line, wherein the isolation of the at least one module by its respective module isolating and connecting means does not affect the operation of or the connection of the remaining modules with the at least one flow line throughout the plural connected processing systems.

According to a further aspect of the invention, there is provided a method for operating a modular processing system, characterised by the steps of:

providing at least two retrievable at least substantially autonomous modules, and a plurality of module isolating and connecting means, each retrievable autonomous module being connected to at least one flow line by one module isolating and connecting means; and isolating one module from the at least one flow line by its respective module isolating and connecting means without affecting the operation of or the connection of the remaining modules with the at least one flow line.

The system or systems may be substantially on a seabed.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
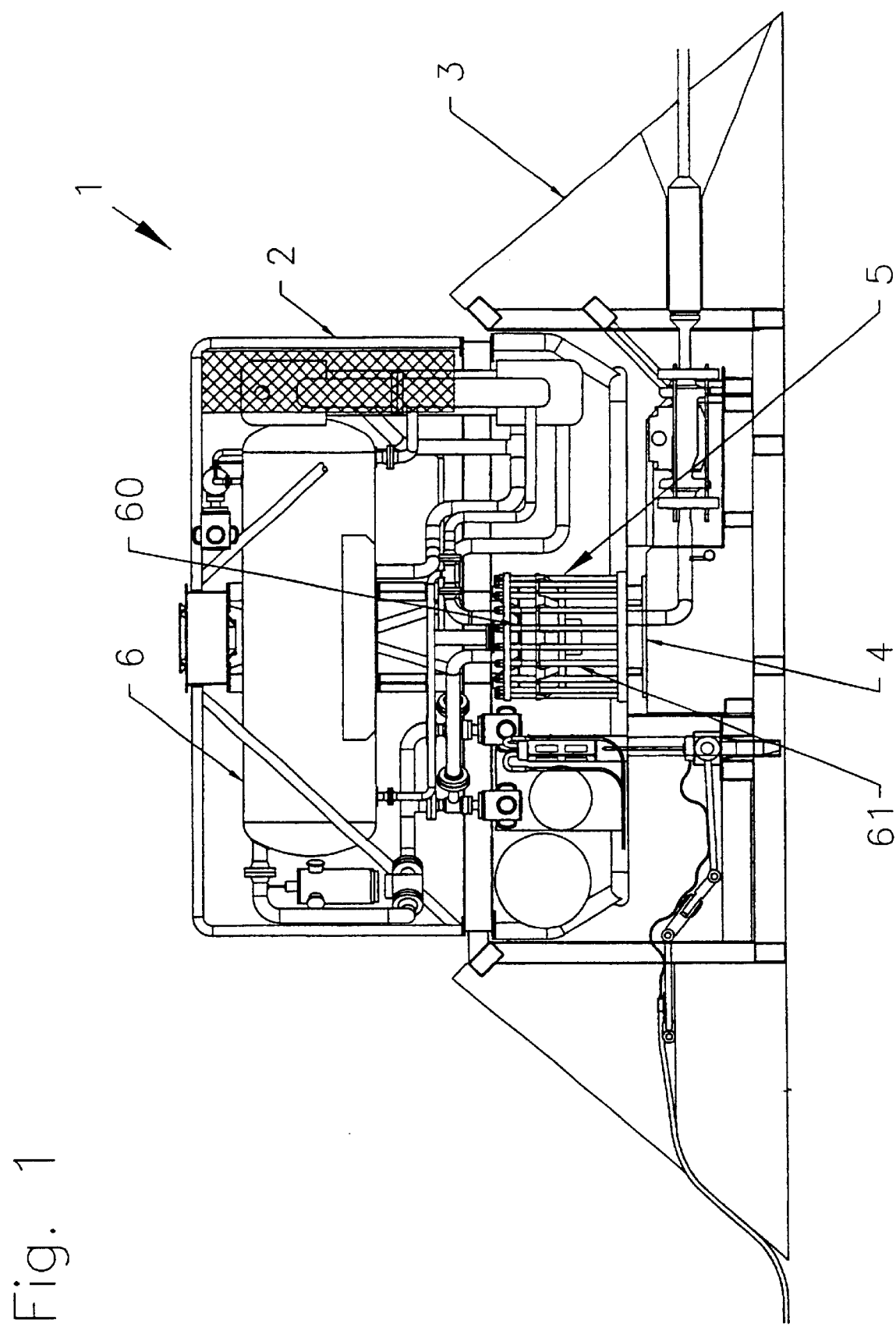
FIG. 1 is an elevational view of a seabed processing system in which a retrievable seabed fluid separation module, according to one embodiment of the invention, is installed.

Referring to FIG. 1 of the accompanying drawings, a modular seabed processing system 1 is illustrated which is connected by underwater flow lines, such as rigid and/or flexible pipelines to wells (not shown) which remove a fluid mixture comprising water and oil/gas from reservoirs beneath the seabed. The modular seabed processing system has a retrievable substantially autonomous fluid separation module 2 where the oil and/or gas is extracted from the fluid mixture and the oil is pumped and/or the gas flows to a host facility (not shown) via flow lines. The host facility may be, for example, onshore or on a fixed or a floating rig.

The modular seabed system 1 comprises a support frame 3 which is essentially of a structural framework construction and is secured to the seabed. Inside the frame 3 is a docking unit 4 which is connected to the flow lines by flow line tie-in and installation tools which are operated by remote operating vehicles (ROVs) or directly from a ship. The retrievable fluid separation module 2 is installed in the frame 3 and is connected to the docking unit 4 by a multi-ported valve isolation connector 5 which is described in GB-A-2261271, which has first and second complementary portions 60,61, and which is adapted to isolate/connect the module 2 to other parts of the system 1. The retrievable module 2 has a separator chamber or vessel 6 for separating gas and liquid from the fluid mixture removed from the reservoirs by the wells. Of course the multi-ported valve isolation connector could be replaced with an alternative connector with associated external isolation valves.

Figure 2:
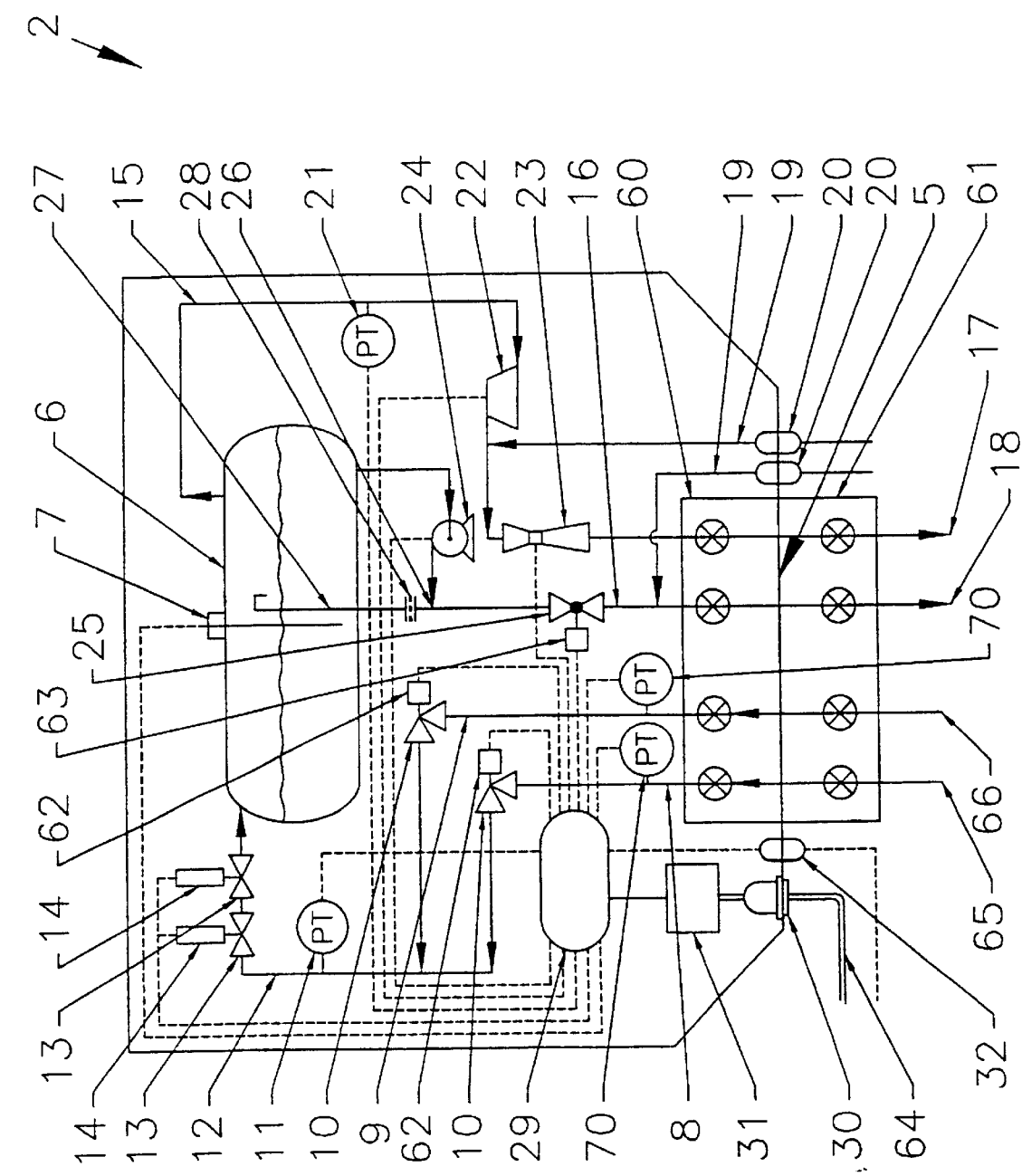
FIG. 2 is a schematic diagram of the retrievable module of FIG. 1.

Referring to FIG. 2, the retrievable fluid separation module 2 is shown with a two-phase separator chamber 6 to which the fluid mixture to be separated flows from the wells. A sensor 7 is provided to detect the position of an interface between the gas and the liquid in the chamber 6.

A plurality of conduits or flowlines 8,9 lead from the first portion 60 of the multi-ported valve isolation connector 5 towards the chamber 6, each conduit having an electrically actuated choke valve 10 for controlling the commingling of fluids flowing into the module from different wells. Each valve is operated by an electrical actuator 62. A pressure measuring device 11 is provided to measure pressure downstream of the choke valves 10 and pressure measuring devices 70 are provided to measure pressure upstream of the choke valves 10. The devices 11,70 are used to measure differential pressure across the choke valves 10. The plurality of conduits 8,9 are combined to form a single input conduit or flowline 12 into the chamber 6. The single input conduit 12 has a pair of fail-safe valves 13 in series, each valve being operated by a fail-safe electrical actuator 14. Such an electrical actuator 14 is described in EP-A-596900 and are configured to rapidly close an associated valve in the absence of an electrical signal thereto. The fail-safe valves 13 are used to protect the separator chamber 6 against overpressuration (e.g. a pressure of over 690 bar (10 k psi)) from the wells.

The chamber 6 has first and second outlet conduits or flowlines 15,16 which are respectively connected to first and second external flow lines 17,18 via the multi-ported valve isolation connector 5. Each outlet conduit 15,16 has a chemical injection line 19 which is connectable to a supply of chemicals from the host facility. The chemicals would be injected into the outlet conduits as part of the normal operation of the module or as a result of a planned or unplanned shut down to prevent unwanted chemical reactions such as hydrate formation, wax deposition and corrosion. The injection lines are adapted to be disconnected by means of disconnectable connectors 20 from the module when the module 2 is retrieved. The first outlet conduit 15 has a pressure measuring device 21 for measuring pressure in the separator chamber 6. The first outlet conduit 15 also has a gas compressor 22 and a flowmeter 23 downstream of the compressor. The second outlet conduit 16 has a liquid booster pump 24 driven by a single speed motor, and a modulating valve 25 downstream of the pump, the valve 25 being operated by an electrical actuator 63. Between the pump 24 and the valve 25 is a junction 26 in the second outlet conduit 16 from which a return line or branch 27 connects the second outlet conduit 16 to the chamber 6 via a flow restrictor 28 such as an orifice plate device, relief valve or a flow control valve. Such a restrictor can be configured to always ensure fluid is available for the pump by allowing between 10 to 25% of fluid passing through the pump to be returned to the separator chamber 6.

A control unit 29 is provided which receives signals from the sensor 7 and the pressure measuring devices 11,70,21 and is adapted to control the modulating valve 25 and the choke valves 10 accordingly by means of the electrical actuators 62,63 respectively. The control unit 29 also receives signals from a flowrate transducer associated with the flowmeter 23 and is adapted to relay these signals to the host facility 52. The control unit 29 also sends an electrical signal to the electrical actuators 14 of the fail-safe valves 13, the absence of which causes the valves 13 to close, such as when there is a power failure. The control unit 29 is also adapted to activate the fail-safe valves 13 when signals from the pressure measuring device 21 indicates that the pressure in the chamber 6 is abnormal such as when there has been a blockage downstream of the chamber. The control unit may also be connected to further sensors. A disconnectable high voltage power connector 30 connects the control unit 29 to a power line 64 attached to the seabed processing system and an electrical transformer 31 reduces the high voltage input from the connector. The control unit preferably comprises a pod divided into two compartments respectively housing solid state control electronics and power distribution switch gear.

A disconnectable control line connector 32 connects the control unit 29 to the control line from the host facility. The power and control line connectors 30,32 are wet mateable. The control unit 29 is housed in a pressure vessel known as a control pod wherein the pod has penetrators for cables from outside the pod to connect to the power and control lines. The host facility provides the power to the module and is in communication with the control unit 29. Although the control unit controls the normal running of the module, it may, for example, be controlled, be reprogrammed or be instructed to shut down the module by the host facility.

Fluid mixture from the wells is received into the separator chamber 6 via input flow lines 65,66 and the mated first and second portions 60 and 61 of the multi-ported valve isolation connector 5 and the conduits 8,9 and the single input conduit 12 into which they combine. The fluid mixture separates as a result of different fluid densities into gas and a liquid which is substantially a mixture of oil and water. The gas is transported to the host facility by means of pressure in the separator chamber 6 and/or by the gas compressor 22 via the first outlet conduit 15, the mated first and second portions 60 and 61 of the multi-ported valve isolation connector 5 and the external flow line 17. The separated liquid is pumped to the host facility by the constant speed pump 24 via the mated first and second portions 60 and 61 of the multi-ported valve isolation connector 5 and the external flow line 18. The return line 27 on the output side of the pump 24 allows some of the pumped liquid to return to the separator chamber 6 from whence it proceeds through the pump 24 again. The flow through the return line 27 (typically some 10 to 25% of the total flow through the pump 24) is controlled by use of the electrically actuated modulating valve 25. The fluid level in the separator chamber 6 is monitored and maintained at the correct level by the control unit 29 operating the electrically actuated modulating valve 25 on the outlet line 16 which thus obviates the need for speed controlled multiphase pumping.

Figure 3:
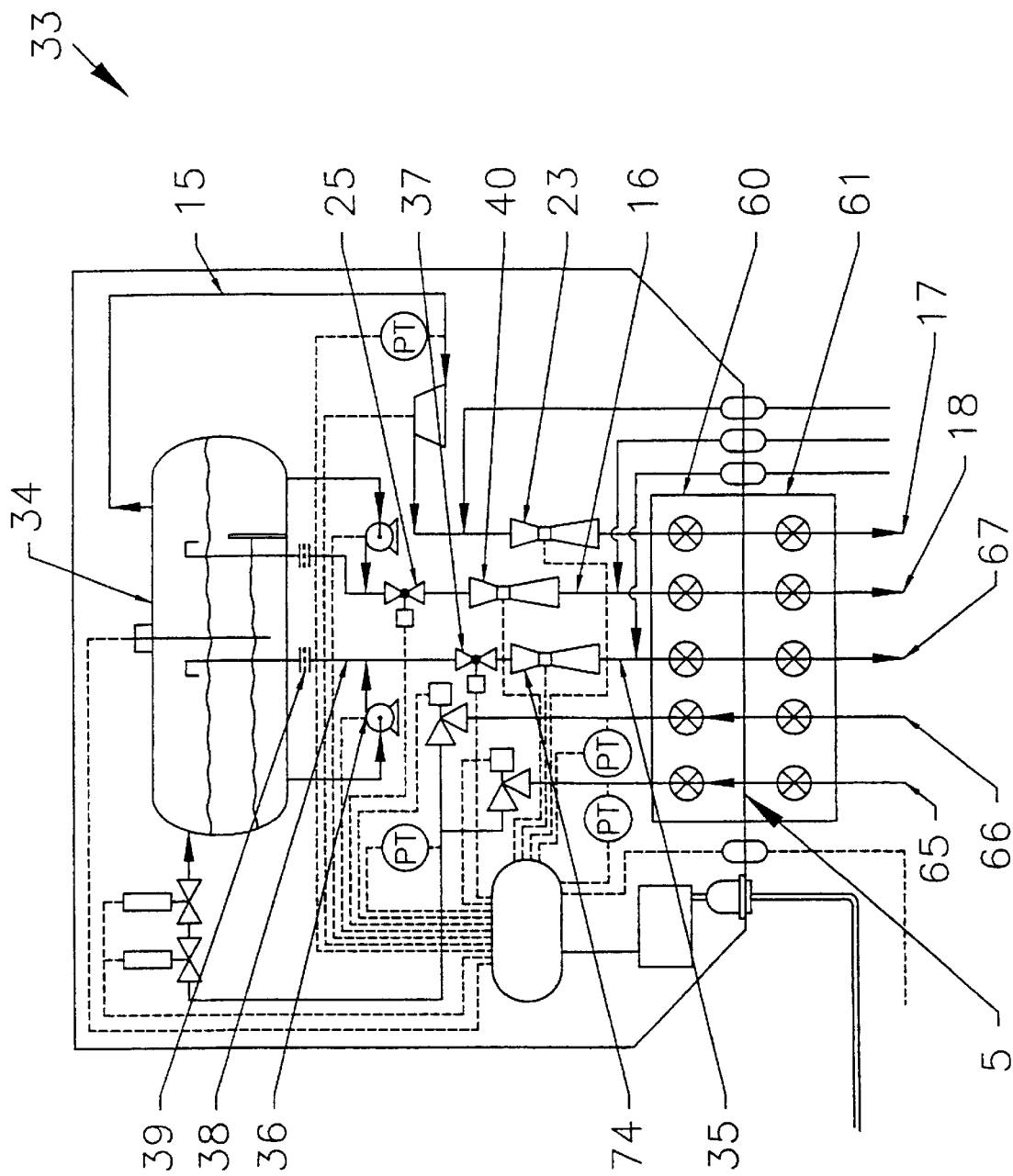
FIG. 3 is a schematic diagram of a retrievable module. according to another embodiment of the invention.

Referring to FIG. 3, a retrievable fluid separation module 33 comprising a three-phase separator vessel or chamber 34 is shown. This is similar to the module 2 except that the module 33 having the three-phase separator chamber 34, has an additional third outlet line 35 for receiving a second separated liquid. The third outlet line 35 has its own constant speed pump 36, an electrically actuated modulated valve 37, a flowmeter 74 and return line 38 with flow restrictor 39. In addition, the second outlet line 16 has a flowmeter 40 downstream of the modulating valve 25. The three-phase separator chamber is typically used to separate gas, oil and water from the received fluid mixture wherein the outlet lines 15,16 carry gas and oil respectively and the third outlet line 35 carries water. The pump 36 pumps the water down an external flow line 67 connected to the module via the mated first and second portions 60 and 61 of the multi-ported valve isolation connector 5.

Figure 4:
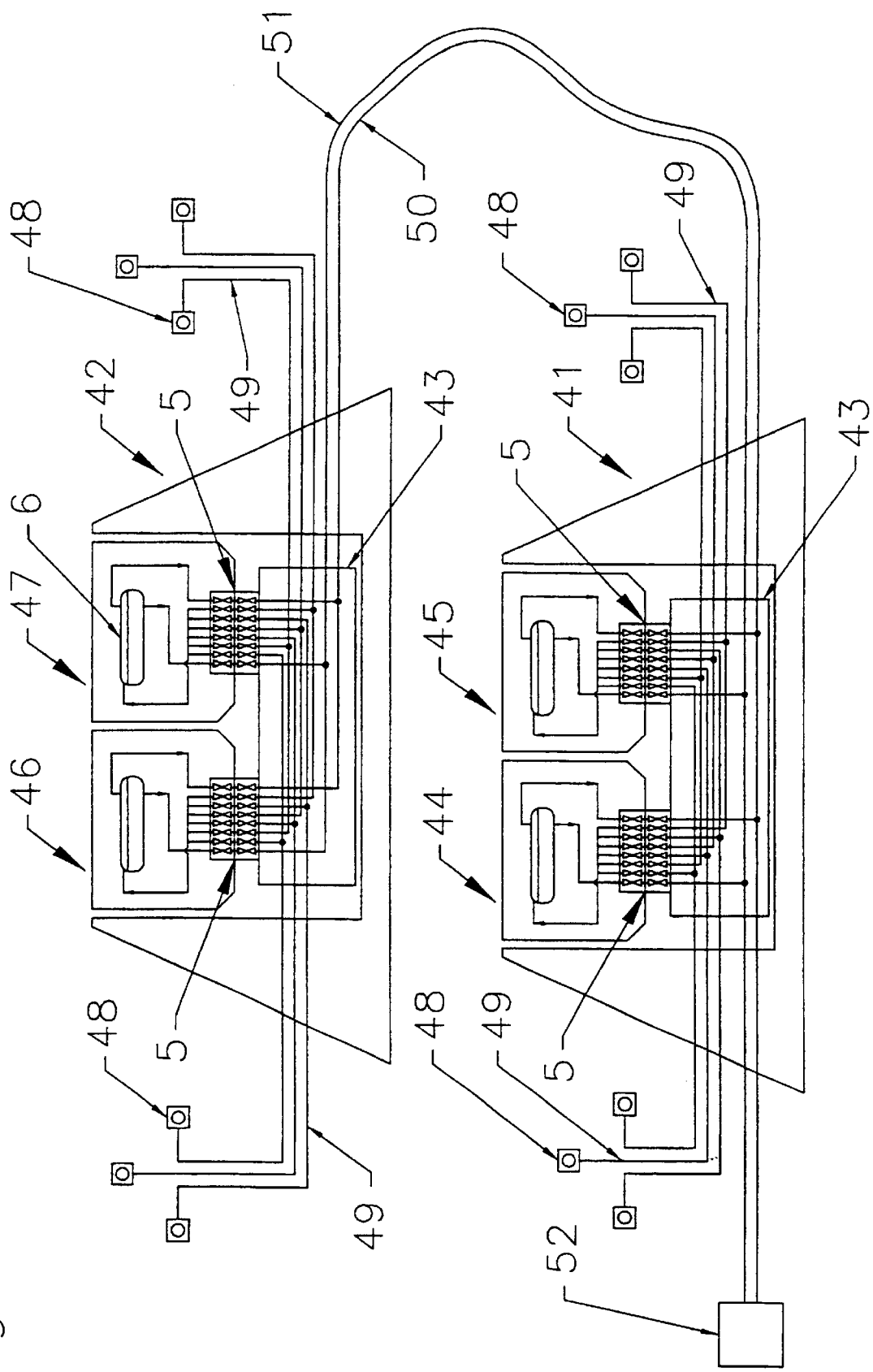
FIGS. 4 to 6 are schematic diagrams of a subsea field showing a module being isolated and subsequently removed from a seabed processing system.

Referring to FIG. 4, in a modification of the invention, first and second seabed processing systems 41,42 are shown wherein each system has a docking unit 43 and holds two retrievable substantially autonomous modules 44,45;46,47, each module being connected to the docking unit by a multi-ported valve isolation connector 5. The docking units 43 of each system 41,42 are connected to production wells 48 by well flow lines 49. Each module has a two-phase separator chamber 6 as shown in FIG. 2.

The first seabed processing system 41 is connected by a gas flow line 50 and a liquid flow line 51 to a host facility 52. The flow lines 50,51 continue beyond the first seabed processing system 41 to the second seabed processing system 42. Thus the second and first seabed processing systems 42,41 are connected in series to the host facility 52 by the flow lines 51,50.

To retrieve a module from one of the seabed processing systems, the valves in the multi-ported valve isolation connector 5 associated with that module are closed, and the module is then retrieved without disturbing the production from any of the other module or modules in the seabed processing system.

Figure 5:
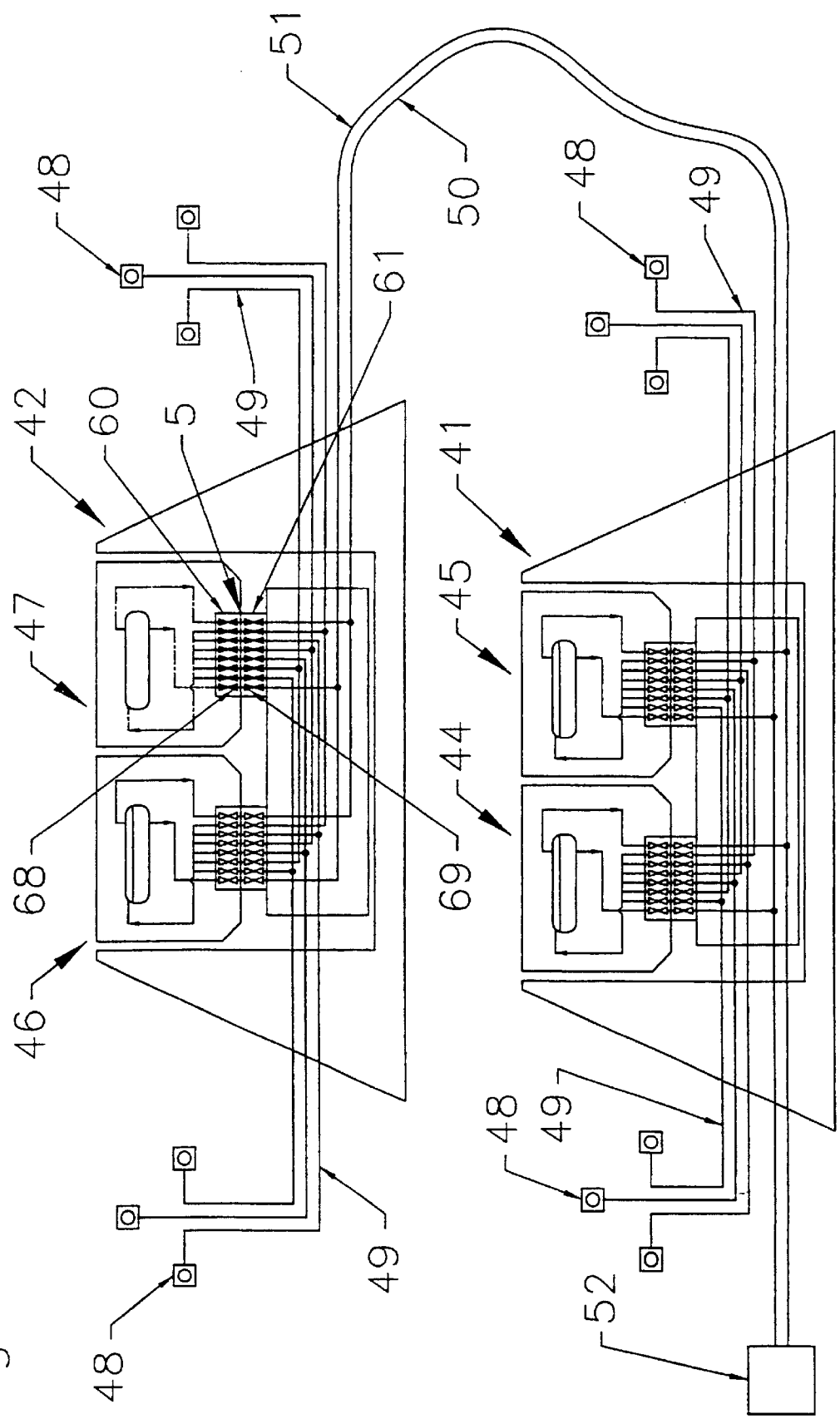
Figure 6:
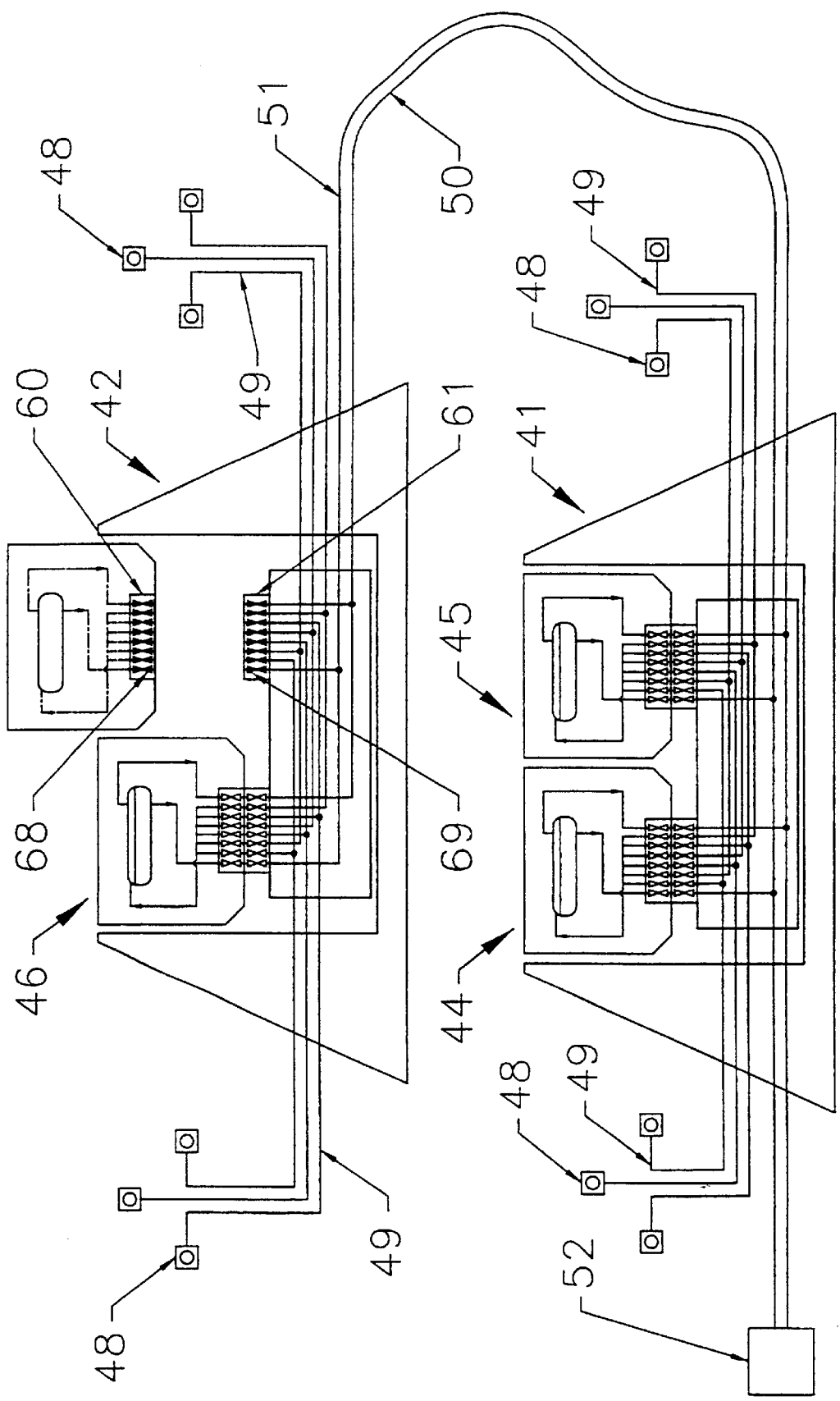

FIGS. 5 and 6 show module 47 being retrieved from the second seabed processing system 42. The multi-ported valve isolation connector 5 has a plurality of pairs of valves 68,69 in the first and second portions 60,61 closed, each one of the pair of valves being in separate portions. The valves 68,69 isolate module 47 from the gas and liquid flow lines 50,51 and from the flow lines 49 from the production wells 48. However, the other module 46 in the second seabed processing system 42 is still connected to the gas and liquid flow lines 50,51 and to the flow lines 49 from the production wells 48 and the modules 44,45 in the first seabed processing system 41 are all still connected to the gas and liquid flow lines 50,51 and to the flow lines 49 from their production wells 48. Hence, all the remaining modules 44,45,46 can continue to operate as the field of wells 48 continues production and module 47 is then retrieved. Thus, there is no need to shut down any wells and this avoids any difficulty in restarting the wells.

Figure 7:
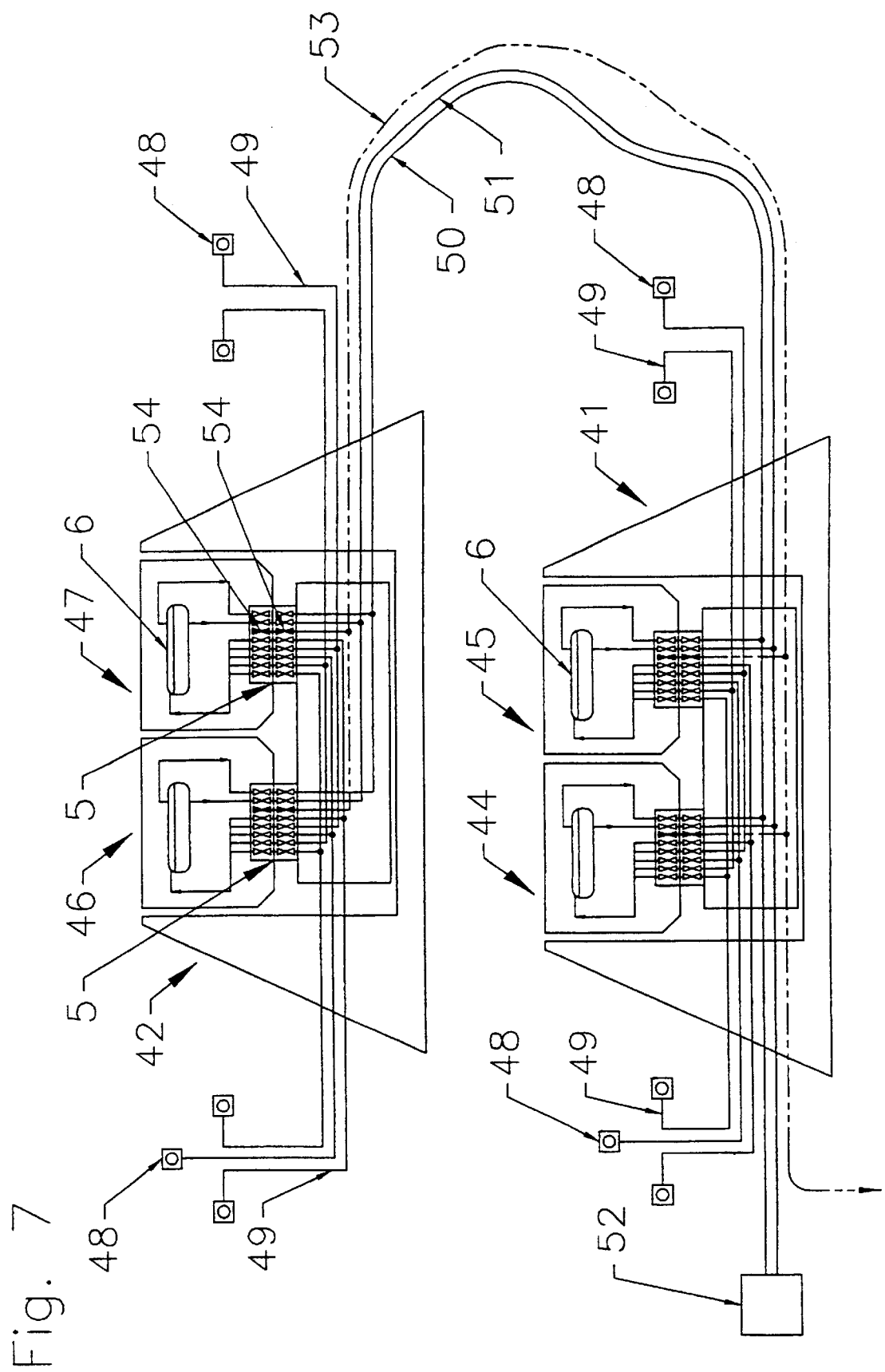
FIGS. 7 to 14 are schematic diagrams of a subsea field showing modules being reconfigured.

Referring to FIG. 7, two seabed processing systems 41,42 are shown in an arrangement the same as that shown in FIG. 4 except that there is a third flow line 53 in addition to the gas flow line 50 and the liquid flow line 51 linking in series first and second seabed processing systems 41,42. This third line 53 may be added at a later date to the first two flow lines and its purpose is to carry water which may contain some oil. However, the third flow line, although linking the seabed processing systems 41,42, does not connect to the host facility 52, but takes the water to a cleaning plant for removing any remaining oil from the water before it is emptied into the sea or takes the water to an injection well into which it is pumped thus extending the life of the field and obviating the need to further separate oil from the water.

Such water removal substantially reduces the volume of liquid to be conveyed to the host facility and the formation of hydrates in fluid being conveyed. FIG. 7 shows the third flow line 53 in place but not yet in use. All the modules shown have two phase separator chambers 6. These are used to separate two components, such as gas and a combined mixture of oil and water from the fluid received from the wells 48 and the seabed processing systems 41,42 deliver each component into a separate flow line 50,51. FIG. 7 shows an arrangement where gas is delivered into the first flow line 50 and a combined mixture is delivered into the second flow line 51. Each of a pair of valves 54 of the multi-ported valve isolation connector 5 for each module 44,45,46,47 is closed. This pair of valves 54 would be used to connect the module to the third flow line 53 which is not yet in operation.

At a certain stage in the life of the field the percentage of water present in the mixture of fluids from the wells may increase. As a consequence, it may be required for the modules to be reconfigured to have three-phase separator chambers or be replaced by modules having three-phase separator chambers. These are used to separate three components, such as gas, oil and water from the fluid received from the well reservoirs and the seabed processing systems deliver each component into a separate flow line.

Figure 8:
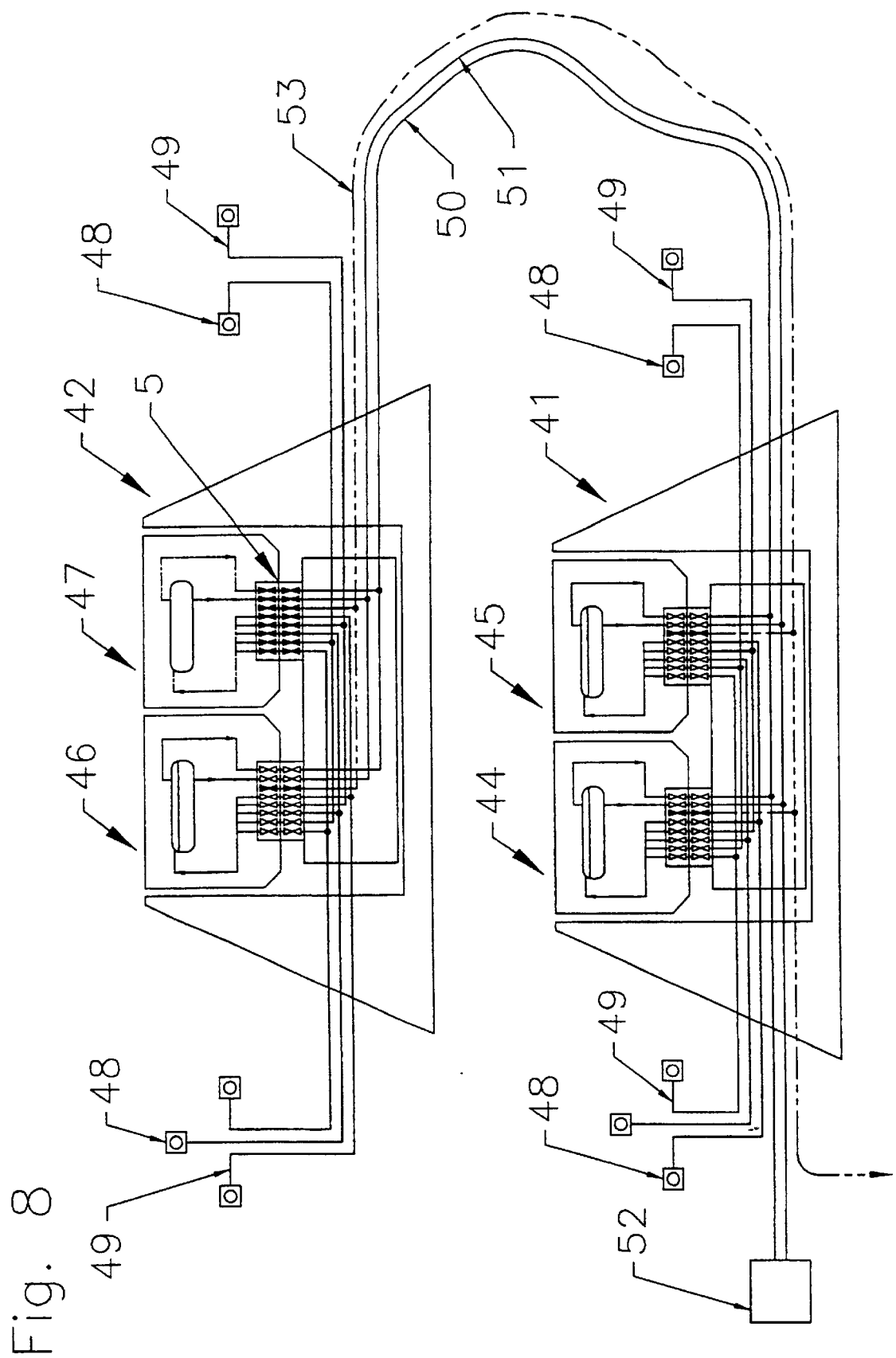
Figure 9:
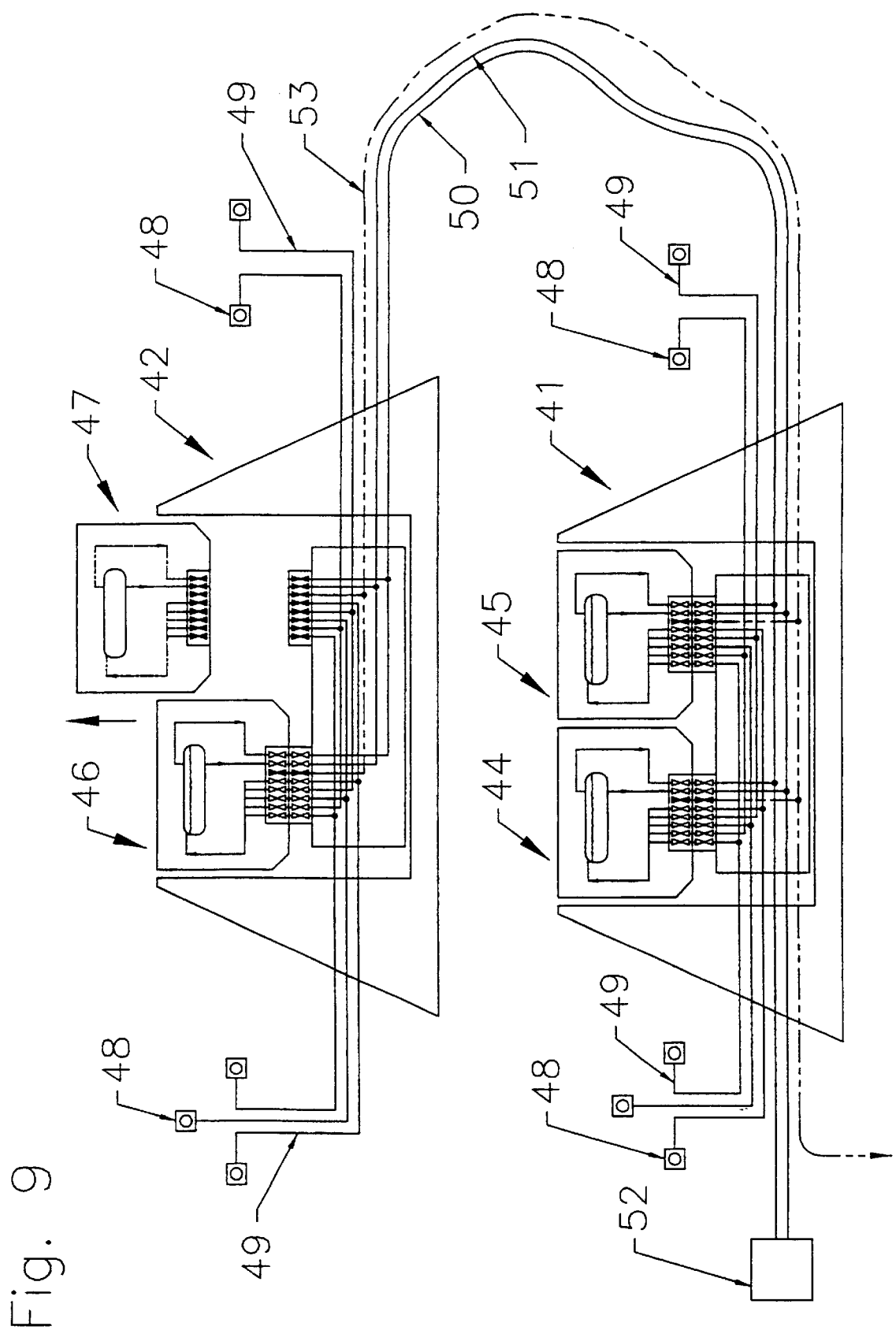

FIGS. 8 and 9 show module 47 being retrieved from the second seabed processing system 42 in the same way as shown in FIGS. 5 and 6 without affecting the production from the remaining modules 44,45,46 in the seabed processing systems 41,42 in the field.

Figure 10:
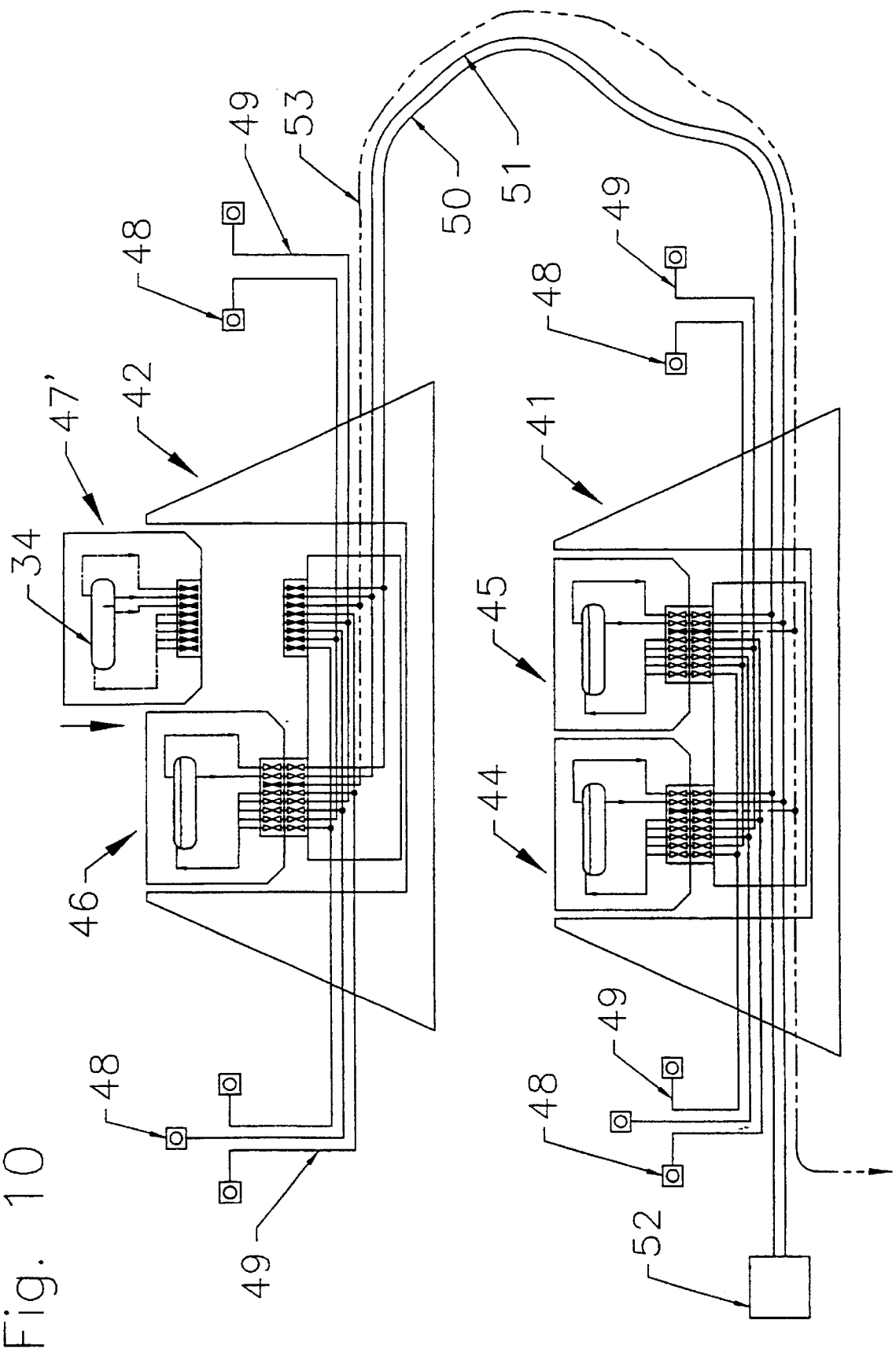
Figure 11:
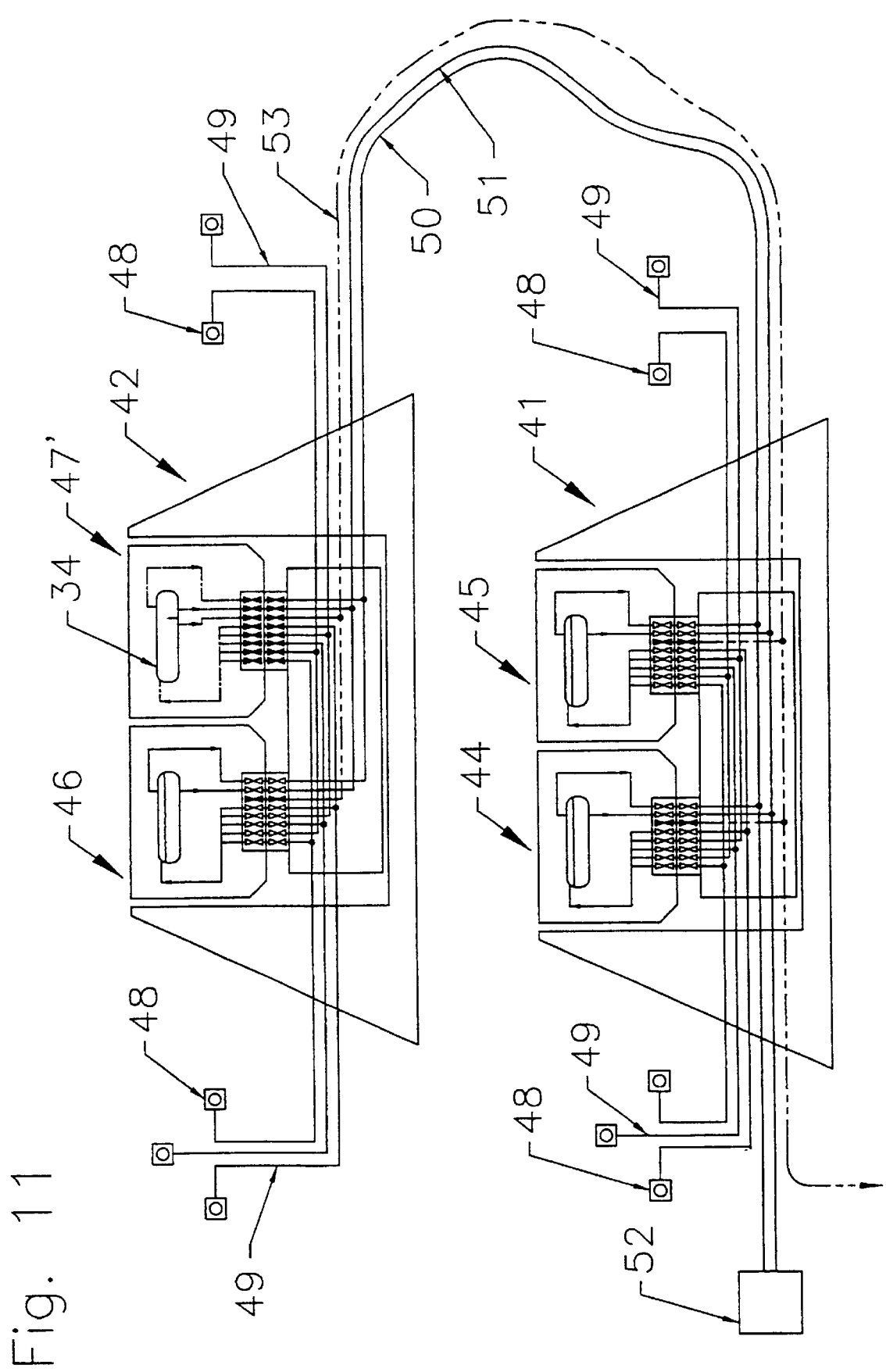
Figure 12:
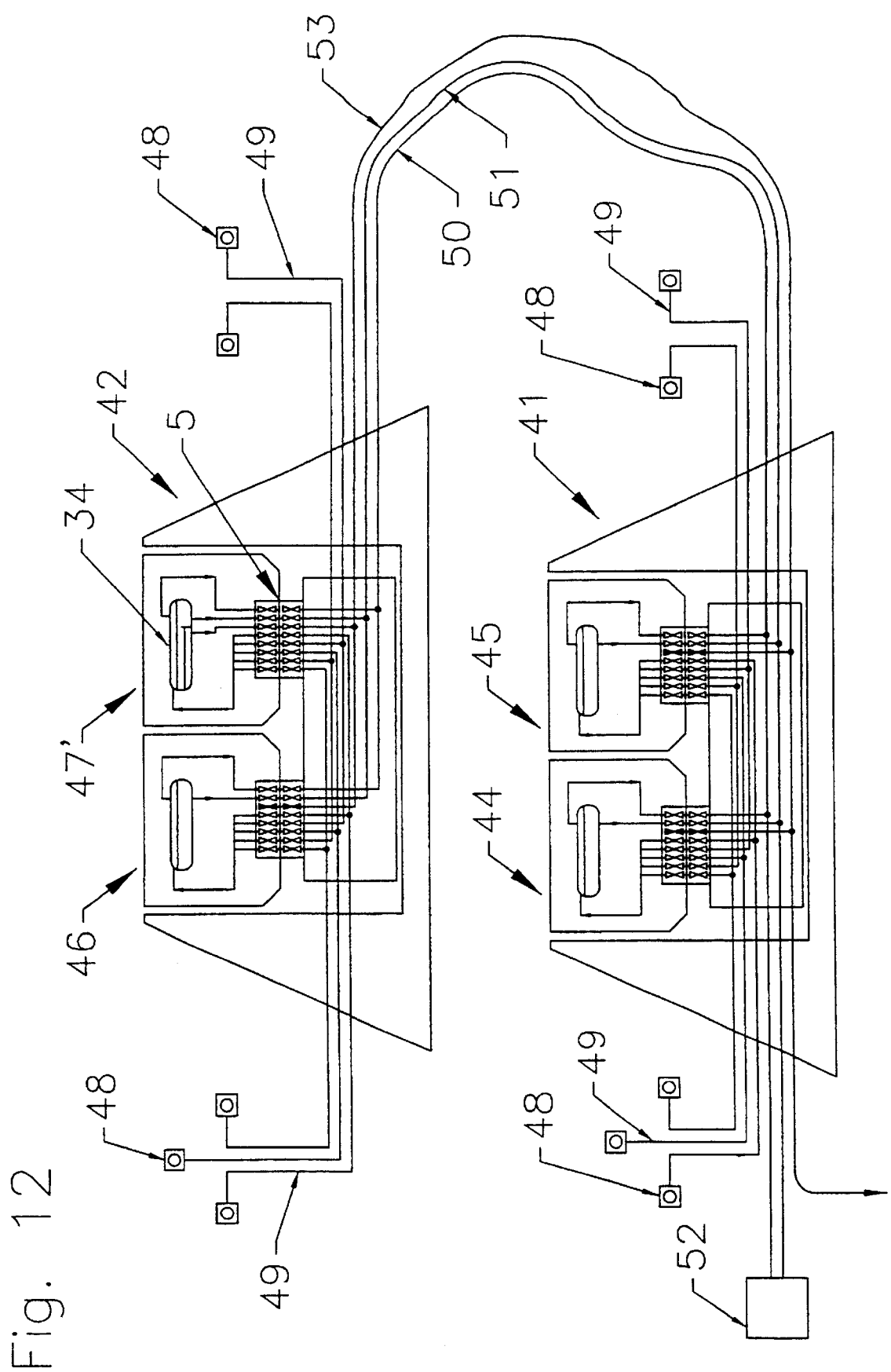

FIGS. 10 and 11 show module 47, being replaced by a module 47' having a three phase separator chamber 34, the replacement module 47' being installed in the second seabed processing system 42. Once installed, the multi-ported valve isolation connector 5 is activated (see FIG. 12) to connect the replacement module 47' to the well flow lines 49, to the first and second flow lines 50,51 and additionally to the third flow line 53 which now commences operation. The three-phase separator 34 in module 47' separates the fluid received from the wells 48 into gas, oil and water which are delivered into the first, second and third flow lines 50,51,53 respectively. The remaining modules 44,45,46 in the seabed processing systems 41,42 in the field continue with two-phase separation.

Figure 13:
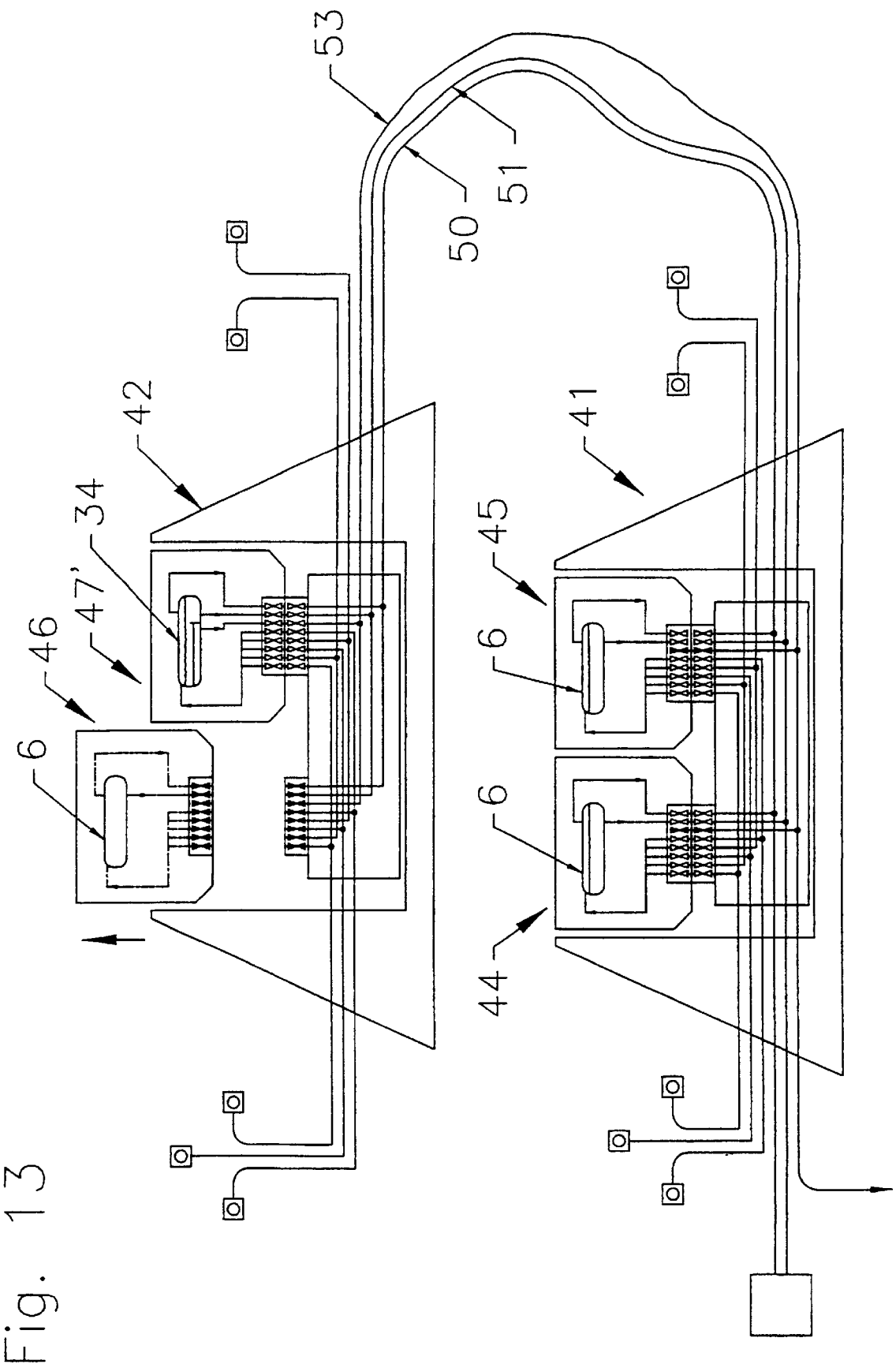
Figure 14:
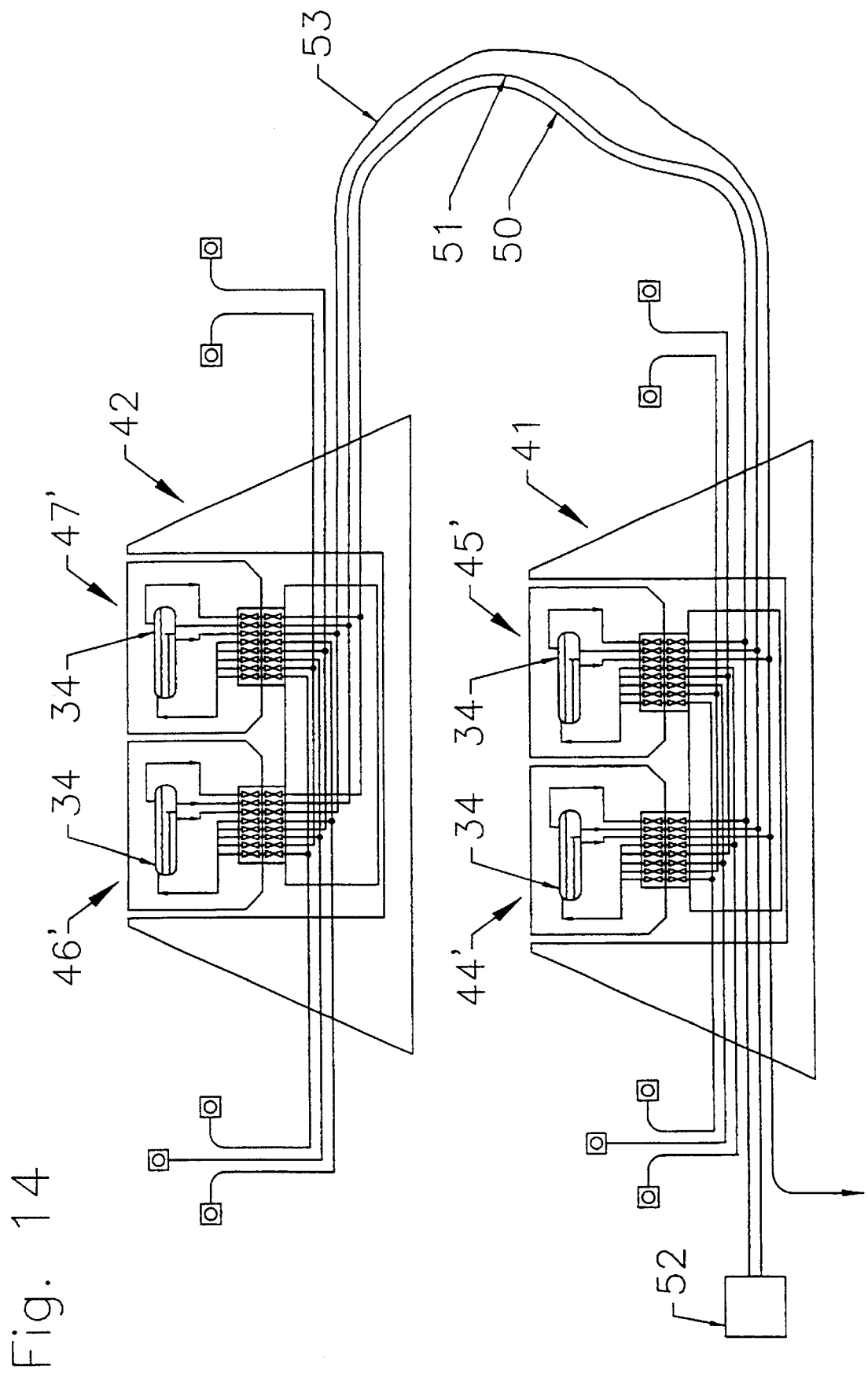

In the same manner, other modules in the seabed processing systems in the field can be replaced with three-phase separation modules without affecting the operation of the remaining modules. FIG. 13 shows module 46 with a two-phase separator chamber 6 being retrieved from the second seabed processing system 42 with module 47' already configured with a three-phase separator chamber 34 and in operation. The two modules 44,45 in the first seabed processing system 41 are still configured with two-phase separator chambers 6. As more modules are reconfigured to three-phase separators, the water content in the oil and water mixture flowing in the second flow line 51 is reduced as water is now being transported by the third flow line 53. FIG. 14 shows the field after all the modules 44',45',46',47' in the two seabed processing systems 41,42 have been reconfigured to have three-phase separator chambers 34 which are all now in operation and are connected to the three flow lines 50,51,53. Thus, essentially, the first flow line 50 is delivering gas to the host facility 52, the second flow line 51 is delivering oil to the host facility 52 and the third flow line 53 is delivering water for disposal.

The retrievable module has equipment for processing hydrocarbons, and has control, power and distribution components all within the module. The module can be fully pre-tested before being installed in the seabed processing system 1. This includes full functional and operational testing. Use of the multi-ported valve isolation connector and the power and control connectors enables easy diverless recovery and re-installation of the module within a short time scale for modification or repair. Modules may be regularly recovered for inspection and servicing as a means of preventative maintenance.

The module, by having pumps 24,36 with single speed motors for transport of oil or water injection and using a modulating valve 25,37 and actuator in conjunction with the level control for the separating chamber 6, overcomes the need for speed control of large, complex, variable speed multiphase pumps.

The control system within the control pod ensures that the level(s) within the separator chamber remain within operating limits by monitoring the signals from the level sensor(s) and implementing the operation of the modulating valve(s) accordingly. The control system monitors the processing system and sends signals to the host facility for information purposes only. However, if abnormal trends or occurrences are detected, then alarm signals are sent to the host facility where manual operation of the processing system can be undertaken by means of a dedicated control panel.

The seabed processing systems are preferably all electric, although hydraulics could be used if so desired. Electrical systems can operate over greater distances/deeper levels, transmit control and emergency signals instantaneously, such as to shut down a part of the seabed processing system, and are cheaper to manufacture and maintain.

Each module has facilities for ROV overriding and monitoring.

A seabed processing system having two modules as described above enables flow measurement of any of the separated fluids. By using valves within the system it is possible to route the well fluid flow from one well to one separating chamber in one module enabling flow measurement of separated fluids from that particular well for well testing purposes. By further use of the valves within the system each well could be tested individually before commingling flow again to equalise flow through the two separator chambers. By having the seabed processing system close to the wellheads saves the cost of a dedicated test flow line from the commingling facility to the host facility and can be achieved more quickly as the length of the test line is eliminated.

As mentioned earlier, the modules may be reconfigured from having a two-phase separator chamber to a three-phase separator chamber to suit the changing characteristics of the field. The modules may also be configured not to necessarily have a separator chamber. A module may be configured to simply manifold or interconnect a plurality of conduits from the multi-ported valve isolation connector and have an outlet conduit to the connector. The plurality of conduits may have choke valves which may be actuated by actuators controlled by a control unit. The outlet conduit may have a pump. The module may be configured to simply pump fluid received via the multi-ported valve isolation connector.

Figure 15:
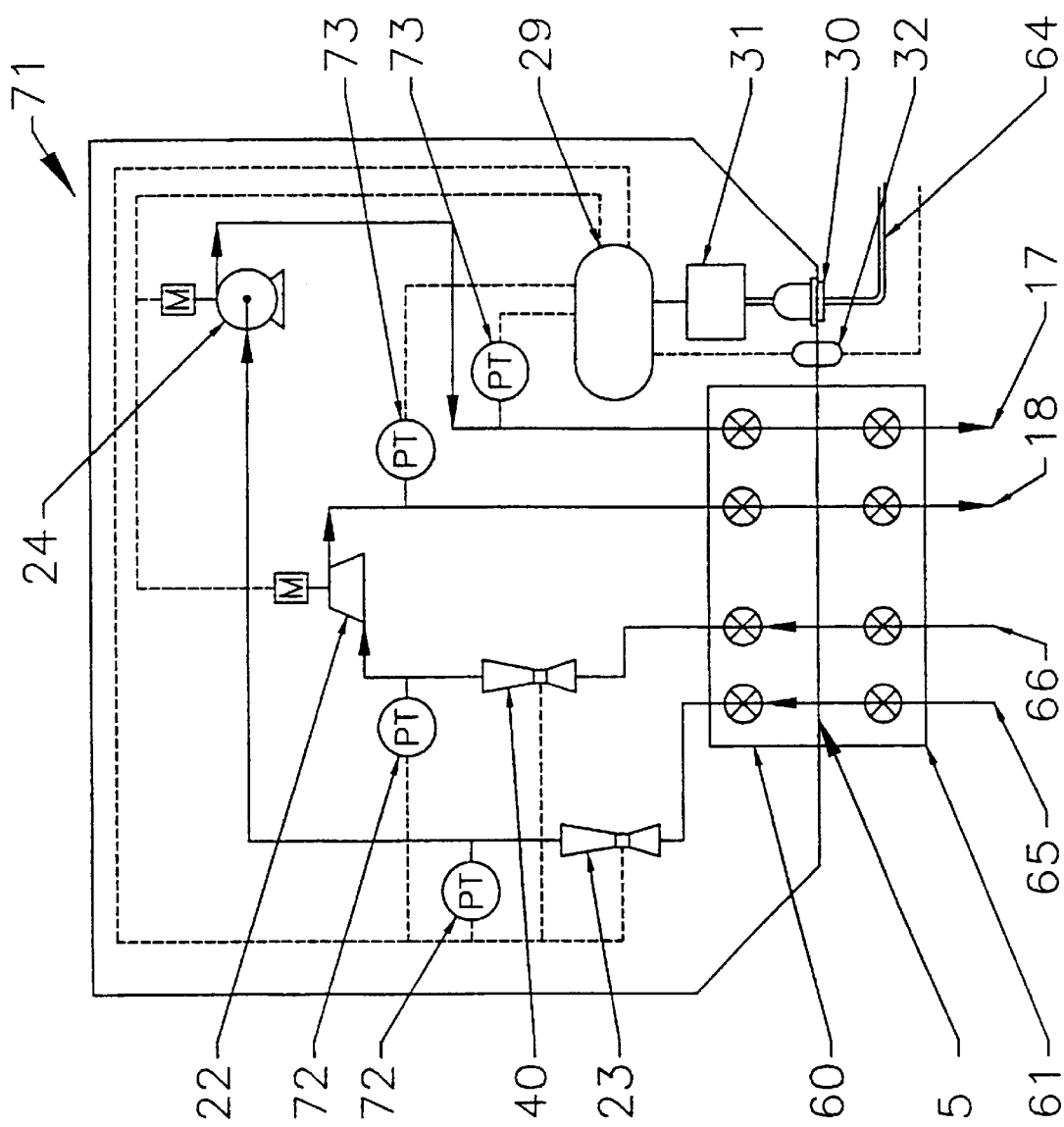
FIG. 15 is a schematic diagram of a retrievable module according to another embodiment of the invention.

Referring to FIG. 15, a module 71 is shown which is substantially similar to the module illustrated in FIG. 2 but has no separator chamber and does not commingle the fluids entering the module. The module 71 has a liquid booster pump 24 for pumping incoming liquid and a gas compressor 22 for compressing incoming gas. A pressure measuring device 72 is provided to measure pressure upstream of the liquid booster pump 24 and the gas compressor 22 respectively and a pressure measuring devices 73 is provided to measure pressure downstream of the liquid booster pump 24 and the gas compressor 22 respectively. These are connected to the control unit 29.

An advantage of a modular seabed processing system is that smaller ships can be used for its installation as opposed to a larger ship required for installing a seabed processing system not divided into separate parts such as support frames, docking units and retrievable autonomous modules.

Whilst particular embodiments have been described, it will be understood that various modifications may be made without departing from the scope of the invention. For example, the system or systems for the retrievable modules may be land based and not underwater.

The power and control lines may be contained in a single supply umbilical or may be replaced by an integrated power/control line. Chemicals may be injected into any number of the outlet conduits. There may only be a single inlet conduit between the multi-ported valve isolation connector 5 and the chamber 6,34.

Water pumped from a module may be manifolded with raw seawater or water supplied from the host facility. This manifolding may take place in the module itself, in the docking unit or downstream from the seabed processing system.

The separating chamber may be adapted to have four-phase separation wherein solids received with the incoming fluid mixture is separated from the fluids separated by the chamber. One of the fluids may substantially comprise sand. The separating chamber may be replaced as a result of a change in processing requirements. it may, for example, be replaced by an improved/modified chamber or be replaced for maintenance purposes.

Any suitable number of processing systems may be used in a field. Each processing system may be designed to hold any suitable number of retrievable autonomous modules. Any flow line between the seabed processing systems and the host facility may carry any suitable component separated from fluid mixture extracted by wells. The support framework 3 of a seabed processing system may be hinged to enable it to be lowered through the "moonpool" of an installation vessel.

A system according to the invention is capable of operating at large "step-out" distances such as over 50 Km from a host facility and in deep water. Therefore, less host facilities are required to exploit a particular field and the life of a host facility can be extended by connecting it to remote satellite fields. Furthermore the system permits abandoned fields to be reopened and marginal fields to be exploited.

Additional systems may be serially connected (daisy-chained) to an existing single or plurality of systems, utilising its flowlines and power and control lines (umbilicals) without needing to shut in any of the wells or upgrade any of the existing equipment.

The module may include pig launching/receiving means, flow line clean up tools, a sand cyclone, and/or water re-injection booster pump(s). The module may include a hydraulic power unit which provides power and control to existing equipment external to the modular system.

What is claimed is:

1. A retrievable fluid separation module (2) for a processing system (1) to which external flow lines are connected, the module including a first portion (60) of a module isolating and connecting means (5) and a separator vessel (6) for separating a plurality of fluids from a received fluid mixture, the separator vessel having at least one inlet flow line (8,9) for the received fluid mixture and at least one outlet flow line (15,16) for each separated fluid, the at least one inlet flow line and the outlet flow lines being connected to the first portion of the module isolating and connecting means for selectively isolating the module from or connecting it to the external flow lines by means of a second complementary portion (61) of the module isolating and connecting means with which the first portion of the module isolating and connecting means is adapted to engage, and the module includes control means (29) for controlling operation of the module (2) whereby the module can operate at least substantially autonomously, and includes separate control signal connection means (32) connected to the control means (29), the control signal connection means being adapted to transmit or receive control signals from beyond the module (2).

2. A module as claimed in claim 1, including a modulating valve (25) in at least one outlet flow line (16) for controlling flow therethrough and a control actuator (63) for controlling the or each modulating valve, the output from the control means (29) being connected to at least one of the control actuators.

3. A module as claimed in claim 1, including sensing means (7) with an output or outputs connected to the control means (29).

4. A module as claimed in claim 3, wherein the sensing means (7) comprises a fluid interface sensing means for detecting the position of an interface between two of the separated fluids in the separator vessel (6).

5. A module as claimed in claim 3, wherein the sensing means comprises means for sensing a plurality of fluid interfaces between three or more separated fluids in the separator vessel (34).

6. A module as claimed in claim 1, including separator vessel pressure measuring means (21) for measuring pressure in the separator vessel (6, 34).

7. A module as claimed in claim 1, including chemical injection means (19) connected to the at least one outlet flow line (15,16).

8. A module as claimed in claim 1, including a power connector (30) for connection to a power source remote from the module (2) to provide power for the module.

9. A module as claimed in claim 8, wherein the power connector is adapted to carry control signals to or from the module (2).

10. A module as claimed in claim 1, wherein the at least one separated fluid is substantially a liquid and the outlet flow line (16) for the liquid includes a single speed pump.

11. A module as claimed in claim 1, including a choke valve (10) in the at least one inlet flow line.

12. A module as claimed in claim 11, including differential pressure measuring means (11, 70) for measuring differential pressure across the choke valve (10).

13. A module as claimed in claim 12, wherein the differential pressure measuring means (11, 70) is connected to the control means (29) which includes means for controlling the choke valve in a manner dependent upon output from the pressure measuring means.

14. A module as claimed in claim 1, including at least one fail-safe valve (13) for controlling flow into the separator vessel (6).

15. A module as claimed in claim 1, wherein at least one said outlet flow line (15) has a flowmeter (23), the flowmeter having an associated flowrate transducer connected to the control means (29).

16. A module as claimed in claim 1, wherein at least one separated fluid is substantially a gas and at least one outlet flow line (15) for the gas has a gas compressor (22).

17. A module as claimed in claim 1, wherein the control means (29) is at least substantially an electrical control means or the control means comprises a completely electrical control means.

18. A modular processing system (41) comprising at least two retrievable at least substantially autonomous modules (44, 45), and a plurality of module isolating and connecting means (5), each retrievable module including control means (29) for controlling operation of the module, and each module being connected to at least one flow line (50, 51) by one module isolating and connecting means, the modules being connected to the at least one flow line and each module is adapted to isolate from the at least one flow line by its respective module isolating and connecting means without affecting the operation of or the connection of the remaining module or modules with the at least one flow line.

19. A system as claimed in claim 18, including a plurality of flowlines to which the modules are connected in parallel.

20. A plurality of processing systems (41,42) as claimed in claim 18, connected by the at least one flow line (50,51) wherein the isolation of the at least one module (47) by its respective module isolating and connecting means (5) does not affect the operation of or the connection of the remaining modules (44, 45, 46) with the at least one flow line throughout the plural connected processing systems (41, 42).

21. A method for acting on fluids in a system (1) to which external flow lines are connected, characterised by the steps of:

providing first and second retrievable modules (2) each module including a first portion (60) of a module isolating and connecting means (5) and first and second means respectively for acting on received fluid in first and second ways respectively, each means for acting on the received fluid comprising at least one inlet flow line (8, 9) for the received fluid and at least one outlet flow line (15, 16), the at least one inlet flow line and the at least one outlet flow line being connected to the first portion of the module isolating and connecting means for selectively isolating each module from or connecting it to the external flow lines by means of a common second complementary portion (61) of the module isolating and connecting means with which each first portion of the module isolating and connecting means is adapted to selectively engage;

connecting the first module to the processing system;

acting on the fluid received in the first way;

disconnecting the module from the processing system;

replacing the first module with the second module for acting on received fluid in the second way;

connecting the second module to the processing system; and acting on the received fluid in the second way.

22. A method for operating a modular processing system (41) characterized by the steps of:

providing at least two retrievable at least substantially autonomous modules (44, 45), and a plurality of module isolating and connecting means (5), each retrievable autonomous module including control means (29) for controlling operation of the module, and each module being connected to at least one flow line (50, 51) by one module isolating and connecting means; and isolating one module from the at least one flow line by its respective module isolating and connecting means without affecting the operation of or the connection of the remaining module or modules with the at least one flow line.

23. A modular processing system as claimed in claim 18, including a manifold structure (43) to which said at least two retrievable at least substantially autonomous modules (44, 45) are connected by said module isolating and connecting means (5), and said at least one flow line is connected to said manifold structure.

24. A modular processing system as claimed in claim 18, wherein at least two of said at least two retrievable at least substantially autonomous modules (44,45) are identical process modules.

25. A modular processing system as claimed in claim 23, including at least one well connected to the manifold structure (43) by at least one of said at least one flow lines.

26. A modular processing system as claimed in claim 23, including a plurality of said wells permanently connected to the manifold structure (43).

27. A modular processing system as claimed in claim 23, wherein the manifold structure (43) is mounted on a seabed.

* * * * *